(12) United States Patent
Hawkins

(10) Patent No.: US 11,009,118 B1
(45) Date of Patent: May 18, 2021

(54) EPICYCLIC GEARING TORQUE REDUCTION MECHANISM

(71) Applicant: John Matthew Hawkins, Brownsburg, IN (US)

(72) Inventor: John Matthew Hawkins, Brownsburg, IN (US)

(*) Notice: Subject to any disclaimer, the term of this patent is extended or adjusted under 35 U.S.C. 154(b) by 0 days.

(21) Appl. No.: 16/663,096

(22) Filed: Oct. 24, 2019

(51) Int. Cl.
*F16H 57/08* (2006.01)
*F16H 57/023* (2012.01)
*F16H 1/36* (2006.01)

(52) U.S. Cl.
CPC .............. *F16H 57/08* (2013.01); *F16H 1/36* (2013.01); *F16H 57/023* (2013.01); *F16H 2057/085* (2013.01)

(58) Field of Classification Search
None
See application file for complete search history.

(56) References Cited

U.S. PATENT DOCUMENTS

| | | | | |
|---|---|---|---|---|
| 1,880,982 A * | 10/1932 | Rawlings | ................ | G01C 19/34 248/581 |
| 2,027,655 A * | 1/1936 | Stoeckicht | ............ | F16H 1/2818 475/344 |
| 2,801,552 A * | 8/1957 | Stubbings | ............. | F16H 1/2818 475/347 |
| 3,026,745 A * | 3/1962 | Forrest | .................. | F16H 1/2818 475/346 |
| 3,315,547 A * | 4/1967 | Fritsch | .................. | F16H 1/2836 475/346 |
| 4,043,210 A * | 8/1977 | Updegrave | ........... | F16H 1/2836 475/346 |
| 4,158,967 A * | 6/1979 | Vatterott | ............... | F16H 1/2836 475/331 |
| 4,424,726 A * | 1/1984 | Galbraith | ................ | F16H 15/52 475/185 |
| 4,986,802 A * | 1/1991 | Scoville | ................ | F16H 1/2836 475/334 |
| 5,890,990 A * | 4/1999 | Palau | ........................ | F16H 1/28 475/346 |
| 6,206,800 B1 * | 3/2001 | Kay | ...................... | F16H 1/2836 475/346 |
| 7,125,359 B2 * | 10/2006 | Milner | .................. | F16H 15/503 475/185 |

* cited by examiner

*Primary Examiner* — Dirk Wright
(74) *Attorney, Agent, or Firm* — Andrew Morabito

(57) ABSTRACT

A torque reduction system for an epicyclic gearing system, comprising: a power source; a sun gear connected to the power source; planetary gears in communication with the sun gear; a ring gear in communication with the planetary gears; and at least one linkage arm connected to the ring gear and a housing.

12 Claims, 1 Drawing Sheet

VIEW A-A

EPICYCLIC GEARING TORQUE REDUCTION MECHANISM

BACKGROUND OF THE INVENTION

The present invention relates to a torque reduction mechanism, and more particularly to epicyclic gearing torque reduction.

The conventional single main rotor helicopters require the production of massive torque forces to generate the desired lift. Through the conversion of the power generated by the engine, an epicyclic gearing is able to convert this power into rotation of the rotors. This conversion of power through the epicyclic gearing is used in many other machines and tools, especially those machines and tools that already employ a planetary gear reduction system.

In the majority of these machines and tools, the rotational of the mechanical components to generate to desired effect result in a large torque force being created. This torque for has to be accounted for when designing the engine or machinery to properly accommodate the design of the shafts, gears, housing, and mechanical components to account for this force.

This is especially true when there is a speed reduction gearbox, such as used in a helicopter, or a speed increasing gearbox, such as used in a wind turbine. In the case of a conventional single main rotor helicopter, if there are mechanical failures, it can result in catastrophic consequences. The components of the helicopter engine, transmission, and overall structure need to be constructed to withstand these incredibly high forces.

Currently, the only means to counteract the torque force is to design the components of the engine to withstand these forces, or incorporate elaborate and extensive systems to reduce the torque while attempting to maintain the desired rotations per minute (rpm) of the engine or in the case of the helicopter the rotors. This results in either the use of expensive materials, increasing the overall strength of the components (typically increasing the weight) or incorporating complex systems to counteract these forces.

SUMMARY

In a first embodiment, the present invention is a torque reduction system for an epicyclic gearing system, comprising: a power source; a sun gear connected to the power source; planetary gears in communication with the sun gear; a ring gear in communication with the planetary gears; and at least one linkage arm connected to the ring gear and a housing.

In a second embodiment, the present invention is a torque reduction system comprising: a planetary gear set comprising; a sun gear, planetary gears, and a ring gear, and a set of linkage arms connected to the ring gear and a housing, wherein the ring gear is restrained from motion.

A torque reduction system comprising: a planetary gear set comprising; a sun gear, planetary gears, and a ring gear, a set of linkage arms connected to the ring gear and a housing, wherein the ring gear is restrained from motion; and at least one set of bearings, wherein the bearings are in contact with the ring gear and a housing element.

DETAILED DESCRIPTION OF THE INVENTION

Figure 1:
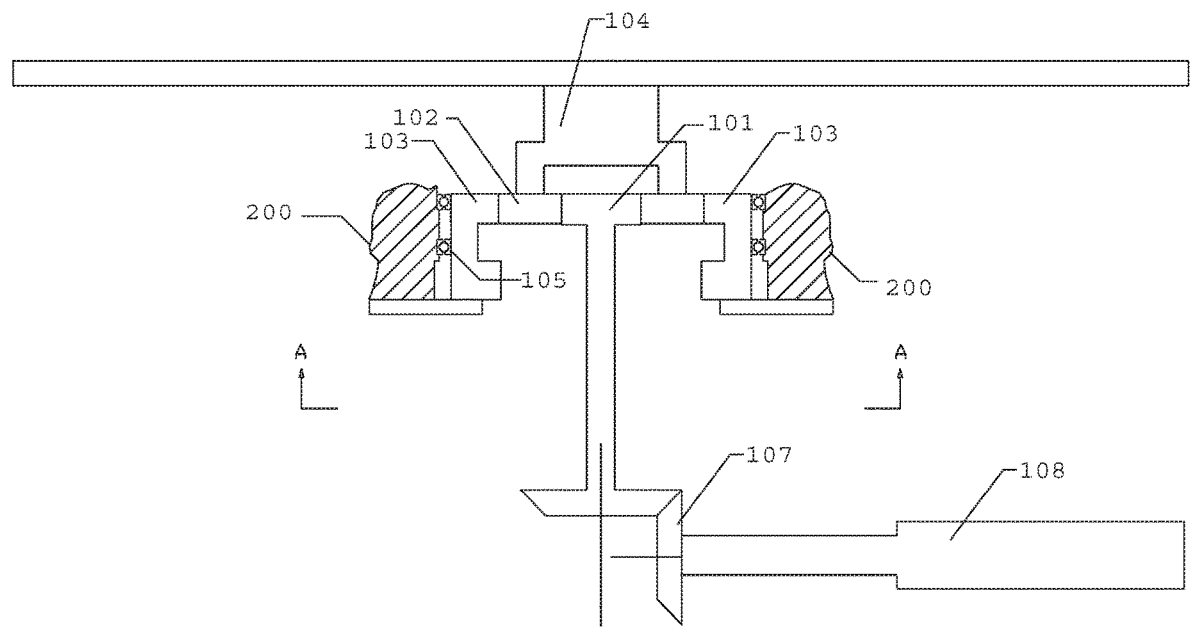
FIG. 1 depicts an illustration of an engine with the torque reduction mechanism integrated, in accordance with one embodiment of the present invention.

The present invention provides a mechanism, system, and/or components which are designed to reduce or eliminate the rotational forces generated by an engine. With the torque reduction mechanism integrated into the gearing, the rotational forces generated by the power source can be transmitted to components of the machine which are able to handle the higher stresses and forces, leaving the vital and sometimes delicate components of the engine free of the excess or dangerous torque forces. This is advantageous to allow for the vital or delicate gears or internal components of an engine or gearing set to be designed with less strength requirements to operate safely.

In this application a helicopter is used, how this is purely for exemplary purposes. This invention can be implemented in any machine or tool that employs an epicyclic gearing with a planetary gear set. The invention is advantageous for a helicopter, because flight safety is improved if there is a loss of tail rotor effectiveness. Loss of tail-rotor effectiveness (LTE) occurs when the tail rotor of a helicopter is exposed to wind forces that prevent it from carrying out its function that of cancelling the torque of the engine and transmission. Any low-airspeed high-power environment provides an opportunity for it to occur. Currently, with loss of tail rotor functioning, the pilot usually must immediately enter autorotation, but this is not always safe to do. Eliminating main rotor yaw reaction torque allows the pilot to pick up forward fight speed and avoid autorotation. Or, the pilot can enter autorotation with better control of the helicopter.

In addition to improving flight safety, there are additional beneficial changes to the overall helicopter design. The tail rotor could be shrunk in size. The tail boom can be shortened, and as an example, an enclosed tail rotor could be relocated to be in back of the passenger cabin.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

FIG. 1 depicts an illustration of an engine 109 with the torque reduction mechanism integrated, in accordance with one embodiment of the present invention. In the depicted embodiment, the gear set is comprised of a sun gear 101, planetary gears 102, a ring gear 103, and the carrier 104. In some embodiments, the sun gear 101 is connected to the engine 108 through a beveled gear mesh 107. In the disclosed examples, the epicyclic gear train incorporates a planetary gear set is shown in a helicopter application. This planetary gear set is for the final drive connecting the gear shaft to the main rotor to generate the necessary forces to rotate the rotors. Typically, in this designed, the ring gear 103 is bolted to the housing or the body of the helicopter 200 and in reduced to a stationary position, permitting the planetary gears 102 to rotate and transfer this rotation to the carrier 104 and then to the rotor 201.

The present invention can be implemented in a variety of applications and the use of a helicopter motor is purely exemplary. The core novelty in the present invention lies in the ability to reduce torque that is applied to the frame or housing through the use of linkage arms which connect a frame or housing with a gear or motor housing.

The present invention incorporates bearings 105 which are positioned between the ring gear 103 and the housing 200, and a set of linkage arms 106 to connect the ring gear 103 to the housing 200. Through the incorporation of the bearings 105, the rotor transmission is no longer directly connected to the housing 200, and the linkage arms 106 remove the reaction torque which is normally transmitted to the ring gear 103.

Mounting the ring gear 103 with the bearings 105 prevents prevents frictional contact with the housing 200. This friction would create adverse torque transfer to the housing 200. In a preferred embodiment, the linkage arms 106 is attachment to the ring gear 103 tangential to the center point of the ring gear 103. This provides the strongest link as it does not have to react bending loads and assures the load path creates the desired offsetting torques. Linkage arms 106 can be positioned to be loaded in tension or compression. Based on the direction of torque transmitted by the ring gear 103. The number of linkage arms 106 used is up to the designer. Two or more linkage arms 106 will commonly be used. The linkage arms 106 can be rigidly mounted to the ring gear 103 and the housing 200. They do not have to be mounted in bearings or bushings.

The linkage arms 106, are designed to meet and/or exceed the strength of the forces which are applied to the linkage arms 106. The shape, size, length, cross section, and design of the linkage arms 106 is modifiable to meet the requirements of the application.

To identify the reduction in forces which are transferred to the housing 200, the calculation below is shown to depict the present transfer of forces from the components of the planetary gear set to the housing 200:

T=torque $T_{bvg}$=reaction torque acting on housing 200 due to the first bevel gearbox output torque. The first bevel gearbox output torque is equal to the planetary sun gear input torque.

$T_{ring\ gear}$=reaction torque of the ring gear against the airframe.

$T_{main}$ rotor blades=reaction torque of the atmosphere acting against the main rotor blades.

From Conservation of Angular Momentum, the sum of the torques acting on the main rotor must equal zero.

$$T_{bvg}+T_{ring\ gear}+T_{main\ rotor\ blades}=0$$

$$T_{planetary\ input}+T_{ring\ gear}=-T_{main\ rotor\ blades}$$

$$T_{ring\ gear}=-T_{main\ rotor\ blades}-T_{planetary\ input}$$

$$X=|T_{main\ rotor\ blades}|-|T_{planetary\ input}|$$

In one embodiment, with a 5:1 speed reduction in the planetary gear set the bevel gear mesh, will transfer one fifth, or 20% of the original yaw torque to the housing 200. The ring gear 103 then transfers 80% of the yaw torque to the housing 200.

Figure 2:
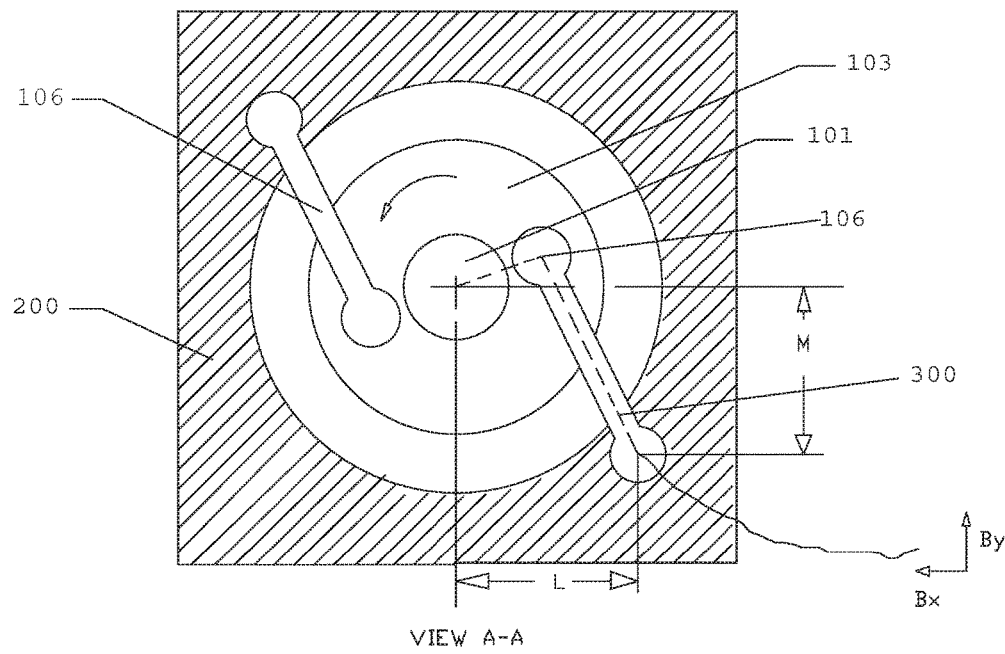
FIG. 2 depicts an illustration of a cross section of the torque reduction mechanism, in accordance with one embodiment of the present invention.

FIG. 2 depicts an illustration of a cross section of the torque reduction mechanism, in accordance with one embodiment of the present invention. The linkage arm 106 is show attached to the ring gear 103 and the housing 200. In the depicted embodiment, there are two linkage arms 106 used. In various embodiments, more or less linkage arms 106 may be implemented. The attachment location of the linkage arms 106 to the ring gear 103 and the housing 200 direct the required length of the linkage arms 106.

The linkage arm 106, as in the depicted embodiment, may have an enlarged end caps to assist in handling the forces applied to the linkage arm 106. In additional embodiments, the linkage arms 106 may have varying designs based on the application of the linkage arm 106. In some embodiments, the ends of the linkage arm 106 have openings to receive various mounting hardware (e.g. screws, rivet, etc.) to mount the linkage arm 106 to housing 200 and the ring gear 103. In some embodiments, the ring gear 103 or the housing 200 and the linkage around 106 are a unitarily created component.

The center axis (dotted line 300) should be tangential to the ring gear 103. In the depicted embodiment, the center axis of the linkage arm 106 is positioned to form a right angle with the ring gear 103 when a line is formed from the center of the ring gear 103 and the center of the attachment point of the linkage arm 106. Various other angles may be employed. With the linkage arm 106 at a 90-degree angle with the center of the ring gear 103, the linkage arm 106 is loaded in tension. The reaction forces exerted by the linkage arm 106 on the housing 200 create offsetting moments of the forces applied to the ring gear 103. This is calculated by:

Resolving the reaction forces at the lower attachment point into $B_x$ and $B_y$. These reaction forces Moments that create a yaw torque will be taken around the centerline of the main rotor. There will be zero net torque from the ring gear 103 acting on the airframe, when:

$$B_x \times M = B_y \times L$$

To account for the 20% (for a planetary with a 5:1 gear ratio) torque from the first bevel gear stage, then the link position would be selected such that:

$$B_x \times M = 1.2 \times B_y \times L$$

This achieves a 20% greater clockwise torque. It is possible to vary the position of the linkage arms 106 and obtain varying amounts of torque cancellation, and even over-cancellation.

Torques balance regardless of center of gravity. Loading cargo and passengers will not change the torque cancellation. The center of gravity is usually close to the vertical centerline of the main rotor, although this is not necessary for this invention to work.

In additional embodiments, the ring gear 103 is replaced with an electric motor housing based on the application of the present invention, as the present invention can be applied to a variety of different applications where the linkage arms 106 can be implemented to reduce the torque forces. Additionally, the housing 200 may be replaced with a gearbox housing based on the application of the present invention. The present invention can be applied to a large variety of application based on the desire to reduce the torque forces which are applied to the housing or frame which supports the rotating components. For example, if the invention was implemented in a wrench or other tools.

In additional embodiments, the application may include a hypoid gear drive. If there is sufficient offset, the moment about the vertical centerline resulting from the pinion separating load, will be equal and opposite to the moment created by the pinion tangential load.

This would occur when B1×offset=B2×L.

The Reaction moment about an axis can be reduced through use of an offset gear mesh. Gears with intersecting axis, such as spur, helical, bevel and spiral bevel, will never reduce the reaction torque. The linkage arms 106 can be positioned to provide the same torque reaction reduction that offset gear meshes provide. The centerline of the linkage arms 106 will never pass through the centerline of the ring gear 103, i.e. there is an offset position to the linkage arms 106.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A torque reduction system for an epicyclic gearing system, comprising:
   a power source;
   a sun gear connected to the power source;
   planetary gears in communication with the sun gear;
   a ring gear in communication with the planetary gears;
   bearings, wherein the bearings are seated on the ring gear and the housing; and
   at least one linkage arm connected to the ring gear and a housing.

2. The torque reduction system for an epicyclic gearing system of claim 1, wherein the linkage arm has a first end, a second end, and a center axis spanning from the first end to the second end, and the first end of the linkage arm is connected to the ring gear and the second end of the linkage arm is connected to the housing at predetermined locations.

3. The torque reduction system for an epicyclic gearing system of claim 2, wherein the center axis of the linkage arm and an axis from the center of the connection point of the first end and a center of the ring gear form a substantially 90-degree angle.

4. The torque reduction system for an epicyclic gearing system of claim 3, wherein the length of the linkage arm is of a predetermined length based on the ring gear.

5. A torque reduction system comprising:
   a planetary gear set comprising;
      a sun gear,
      planetary gears,
      a ring gear,
   a set of linkage arms connected to the ring gear and a housing, wherein the ring gear is restrained from; and
   a set of bearings, wherein the bearings are seated on the housing and the ring gear.

6. The torque reduction system of claim 5, wherein a center axis of the linkage arm and the sun gear form a 90 degree angle.

7. The torque reduction system of claim 5, wherein the linkage arm has an enlarged section distal to the mount points.

8. The torque reduction system of claim 5, wherein the linkage arms are mirrored about a center line of the sun gear.

9. The torque reduction system of claim 5, wherein the linkage arm is connected to the ring gear and a housing, and the linkage arms are in a static position.

10. The torque reduction system of claim 5, wherein the bearings are designed to prevent frictional contact between the housing and the ring gear.

11. The torque reduction system of claim 5, wherein the set of linkage arms is designed to withstand the force transferred to the housing from the ring gear.

12. The torque reduction system of claim 11, wherein the position of the set of linkage arms is determined based on the ring gear movement.

* * * * *